(12) United States Patent  (10) Patent No.: US 8,781,221 B2
Ding et al.  (45) Date of Patent: Jul. 15, 2014

(54) HAND GESTURE RECOGNITION SYSTEM

(75) Inventors: Dayong Ding, Beijing (CN); Wenlong Li, Beijing (CN); Yimin Zhang, Beijing (CN); Xiaofeng Tong, Beijing (CN); Jianguo Li, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/574,823

(22) PCT Filed: Apr. 11, 2011

(86) PCT No.: PCT/CN2011/000619
§ 371 (c)(1),
(2), (4) Date: Feb. 7, 2014

(87) PCT Pub. No.: WO2012/139241
PCT Pub. Date: Oct. 18, 2012

(65) Prior Publication Data
US 2014/0147035 A1  May 29, 2014

(51) Int. Cl.
G06K 9/34  (2006.01)
(52) U.S. Cl.
USPC .......................................................... 382/164
(58) Field of Classification Search
USPC .................... 382/162, 164, 118, 124
See application file for complete search history.

(56) References Cited

U.S. PATENT DOCUMENTS

| 6,002,808 | A | 12/1999 | Freeman |
| 6,016,148 | A | 1/2000 | Kang et al. |
| 6,031,539 | A | 2/2000 | Kang et al. |
| 8,433,101 | B2 * | 4/2013 | Xu et al. .................... 382/107 |
| 2003/0020617 | A1 | 1/2003 | Tice et al. |
| 2006/0133672 | A1 | 6/2006 | Li et al. |
| 2008/0069408 | A1 | 3/2008 | Cervantes |
| 2008/0244465 | A1 * | 10/2008 | Kongqiao et al. ............ 715/863 |
| 2008/0310759 | A1 | 12/2008 | Lui et al. |
| 2010/0215257 | A1 * | 8/2010 | Dariush et al. ................ 382/159 |
| 2013/0265448 | A1 * | 10/2013 | Li ............................. 348/207.1 |
| 2014/0004834 | A1 * | 1/2014 | Mian et al. ................. 455/414.1 |
| 2014/0037134 | A1 * | 2/2014 | Tong et al. .................... 382/103 |

FOREIGN PATENT DOCUMENTS

| CN | 1731416 A | 2/2006 |
| CN | 1776711 A | 5/2006 |
| CN | 101216882 A | 7/2008 |
| CN | 101356539 A | 1/2009 |

(Continued)

OTHER PUBLICATIONS

Bay, et al., "Speeded-Up Robust Features (SURF)", Sep. 10, 2008, 14 pages, pp. 1-14.

(Continued)

*Primary Examiner* — Ishrat I Sherali
(74) *Attorney, Agent, or Firm* — Grossman, Tucker, Perreault & Pfleger

(57) ABSTRACT

A cost-effective and computationally efficient hand gesture recognition system for detecting and/or tracking a face region and/or a hand region in a series of images. A skin segmentation model is updated with skin pixel information from the face and iteratively applied to the pixels in the hand region, to more accurately identify the pixels in the hand region given current lighting conditions around the image. Shape features are then extracted from the image, and based on the shape features, a hand gesture is identified in the image. The identified hand gesture may be used to generate a command signal to control the operation of an application or system.

18 Claims, 8 Drawing Sheets

(56) References Cited

FOREIGN PATENT DOCUMENTS

| CN | 101593272 A | 12/2009 |
|---|---|---|
| CN | 101667250 A | 3/2010 |
| CN | 101677720 | 3/2010 |
| CN | 101894262 A | 11/2010 |
| CN | 102142078 A | 8/2011 |
| KR | 2007-0117922 A | 12/2007 |
| WO | 2012/000135 A1 | 1/2012 |
| WO | 2012/129727 A1 | 10/2012 |
| WO | 2012/139241 A1 | 10/2012 |
| WO | 2012/139273 A1 | 10/2012 |

OTHER PUBLICATIONS

Lienhart, et al., "Empirical Analysis of Detection Cascades of Boosted Classifiers for Rapid Object Detection", MRL Technical Report, May 2002, revised Dec. 2002, 7 Pages.

Viola, et al., "Robust Real-time Object Detection", Second International Workshop on Statistical and Computational Theories of Vision—Modeling, Learning, Computing, and Sampling, Jul. 13, 2001, pp. 1-25.

Wilson, et al., "Facial Feature Detection Using HAAR Classifiers", CCSC; south central Conference, Apr. 1, 2006, pp. 127-133.

Zhu, et al., "Fast Human Detection Using a Cascade of Histograms of Oriented Gradients", IEEE Computer Society Conference on Computer Vision and Pattern Recognition, Jun. 2006. 10 Pages.

International Search Report and Written Opinion, International Search Report and Written Opinion received for PCT application No. PCT/CN2011/081642, mailed on Aug. 9, 2012, 9 Pages.

Li et al., "Object Detection Using Extended SURF Features", PCT patent application No. PCT/CN2011/081642 filed on Nov. 1, 2011, 29 Pages.

International Search Report and Written Opinion received for PCT application No. PCT/CN2011/072597, mailed on Jun. 23, 2011, 3 Pages.

International Search Report and Written Opinion received for PCT application No. PCT/CN2011/000553, mailed on Jan. 5, 2012, 12 Pages.

International Search Report and Written Opinion dated Jan. 12, 2012 issued in related International Patent Application No. PCT/CN2011/000619 (10 pages).

\* cited by examiner

HAND GESTURE RECOGNITION SYSTEM

CROSS REFERENCE TO RELATED APPLICATIONS

This application is a U.S. national stage completion of International Application No. PCT/CN2011/000619 filed Apr. 11, 2011, the entire content of which is herein incorporated by reference.

FIELD

The present disclosure relates to a human-computer interface (HCI), and, more particularly, to hand gesture recognition system.

BACKGROUND

Gesture-based HCI systems are known, and generally provide a more or less natural mechanism to provide input to an application or system. For example, HCI systems in the context of video games (e.g., Wii®) are known. These systems use sensors, such as accelerometers and gyroscopes, to give feedback information about the position of a user's hands, feet, body, etc. Another type of HCI system uses markers that are placed on the user to enable a video system to detect various positions of the user based on the position of the markers. However, marker systems have obvious drawbacks, in that extensive user positioning of the markers on various locations of the user's body is required. Another HCI system uses a depth camera to provide a measure of the distance of a point of view to the camera. This distance, i.e, depth, might be useful in some scenarios for tracking and recognition, but such systems typically lack robustness, are computationally intensive, and are usually very expensive to implement.

BRIEF DESCRIPTION OF DRAWINGS

Features and advantages of the claimed subject matter will be apparent from the following detailed description of embodiments consistent therewith, which description should be considered with reference to the accompanying drawings, wherein:

FIG. 3A depicts an example of an MLP computation system consistent with one embodiment of the present disclosure;

Although the following Detailed Description will proceed with reference being made to illustrative embodiments, many alternatives, modifications, and variations thereof will be apparent to those skilled in the art.

DETAILED DESCRIPTION

Generally, this disclosure provides a hand gesture recognition system (and methods). A camera is used to capture an image or video of a user, particularly the face and one or both hands of the user. Facial and hand detection modules are employed to detect the user's face and hand(s) regions within the image. A tracking module may be used to track the user's hand and face regions through a series of images. General skin color models may be used to segment the hand and face regions into a binary image. The face region, in turn, may be used to update certain variables of the general skin color model, and the hand region may be processed using the updated skin color model. Once the hand region is processed, a hand gesture recognition module may be used to identify a specific hand gesture within the hand region. The hand gesture may be used as a control signal for software and/or other system components. Advantageously, updating a general skin color model in this manner may enable enhanced gesture recognition under different lighting conditions. In addition, the hand gesture recognition system of the present disclosure may be used with a low-cost (and widely available) video camera, thus enabling the system for wide-spread adoption. The modules of the present disclosure may offer enhanced image processing speeds using conventional camera devices to enable real time (or near real time) hand gesture identification and control, while providing hand gesture recognition without the use of hand-held controllers, marker systems or proprietary camera systems.

Figure 1:
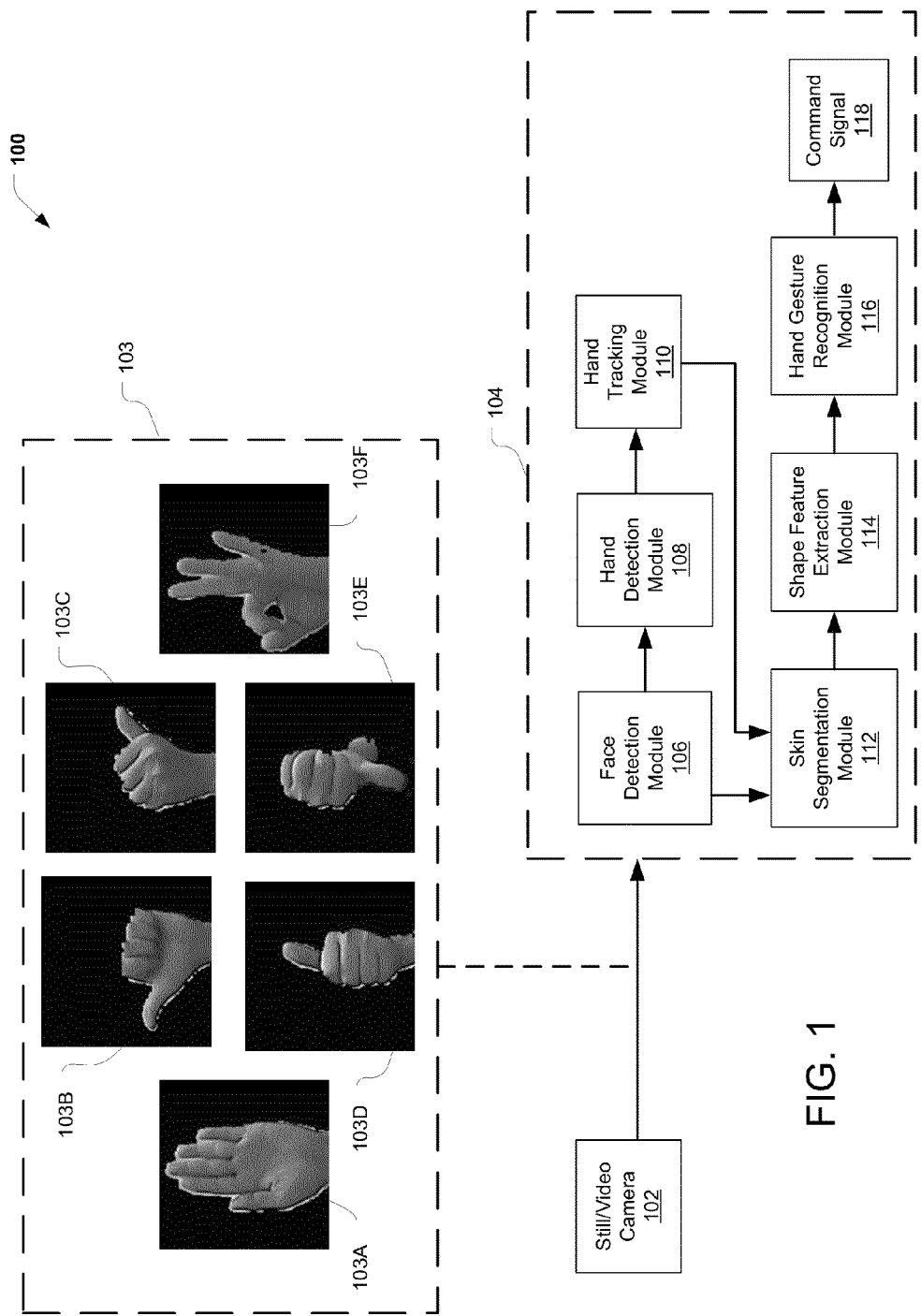
FIG. 1 illustrates a hand gesture recognition system consistent with various embodiments of the present disclosure.

FIG. 1 illustrates a hand gesture recognition system 100 consistent with various embodiments of the present disclosure. In general, the system 100 of FIG. 1 includes a video camera 102 and an image processing module 104. The video camera 102 may include any commercially-available still or moving video imaging device (analog or digital) capable of capturing an image or series of images. The camera 102 may include, for example, a web camera (as may be associated with a personal computer and/or TV monitor), handheld device camera (e.g., cell phone camera, smart phone camera (e.g., camera associated with the iPhone®, iPad®, Trio®, Blackberry®, Droid®, etc.), laptop computer camera, etc.), etc. The video camera 102 may be configured to capture an image or video of an environment that includes one or more persons, and may have adequate resolution to capture at least one hand gesture of one or more persons in the environment. Example of hand gestures 103 that may be captured by the camera 102 include a "stop" hand 103A, a "thumb right" hand 103B, a "thumb left" hand 103C, a "thumb up" hand 103D, a "thumb down" hand 103E and an "OK sign" hand 103F. Of course, images 103 are only examples of the types of hand gestures that may be used with the present disclosure, and these are not intended to be an exhaustive list of the types of hand gestures that may be used with the present disclosure.

The image processing module 104 is generally configured to process an image or series of images to identify a hand gesture of one or more persons depicted in the image, and to generate a command signal 118 indicative of the identified hand gesture. The command signal 118 may, in turn, be used to control, for example, hardware and/or software (not shown) that may be coupled to the image processing module 104. The image processing module 104 may include a face detection module 106 configured to detect one or more face regions in an image. The face detection module 106 may include custom, proprietary, known and/or after-developed facial recognition systems (or instruction sets) that are generally well-defined and operable to receive a standard format image (e.g., RGB color image) and identify, at least to a certain extent, a face in the image. Known face detection systems that may be used in accordance with the teachings of the present disclosure include Principal Component Analysis with eigenface, Linear Discriminate Analysis, Elastic Bunch Graph Matching fisherface, the Hidden Markov model, neuronal motivated dynamic link matching, skin texture analysis, neutral network, support vector machine, boosted Haar-cascade detection, Speed-Up Robust Features (SURF) facial recognition schemes (and extension and/or derivatives thereof), etc.

In addition, the image processing module 104 may also include a hand detection module 108 configured to detect one or more hand regions in an image. The hand detection module 108 may include custom, proprietary, known and/or after-developed hand recognition code (or instruction sets) that are generally well-defined and operable to receive a standard format image (e.g., RGB color image) and identify, at least to a certain extent, a hand in the image. Such known hand detection systems include computer vision systems for object recognition, 3-D reconstruction systems, 2D Haar wavelet response systems (and derivatives thereof), skin-color based method, shape-based detection, Speed-Up Robust Features (SURF) facial recognition schemes (and extension and/or derivatives thereof), etc.

To alleviate additional processing requirements, the face detection module 106 and hand detection module 108 may be optimized so that each module is only used to process the image to a certain extent, e.g., without requiring actual face or hand identification. Rather, the face detection module 106 and/or the hand detection module 108 may be utilized simply to define regions in the image, to a predefined level of approximation or accuracy, which may contain a face and/or a hand. Since the image processing system 104 of the present disclosure may rely on other methods (described below) to actually identify a hand gesture, the face and hand detection modules 106/108 may be optimized so that their respective processing requirements do not significantly impact system performance and throughput.

The image processing module 104 may also include a hand tracking module 110 generally configured to track a hand region (defined by the hand detection module 108) through a series of images (e.g., video frames at 24 frames per second). The hand tracking module 110 may include custom, proprietary, known and/or after-developed tracking code (or instruction sets) that are generally well-defined and operable to receive a series of images (e.g., RGB color images) and track, at least to a certain extent, a hand in the series of images. Such known tracking systems include particle filtering, optical flow, Kalman filtering, etc., each of which may utilize edge analysis, sum-of-square-difference analysis, feature point analysis, etc.

In one example embodiment, mean-shifting techniques may be used to track selected regions in a series of images. Generally, to track an object or region in a series of images, the mean-shifting technique may process a moving object (or region) based on color histograms. The mean-shift tracking technique, used in this embodiment, may include iterative processes of comparing the histogram of the original object (or region) in a current image frame and histogram of candidate regions in the next image frame. A general description of the mean-shifting technique may be given as follows:

1) Consider a set S of n data points $x_i$ in d-D Euclidean space X.
2) Let K(x) denote a function that indicates how much x contributes to the estimation of the mean.
3) Then, the sample mean m at x with kernel K is given by:

$$m(x) = \frac{\sum_{i=1}^{n} K(x - x_i) x_i}{\sum_{i=1}^{n} K(x - x_i)} \qquad \text{EQ. 1}$$

4) The difference m(x) −x is called the mean shift

The mean-shifting technique, according to this embodiment, may be configured to iteratively move a data point to its mean. Thus, in each iteration, x←m(x). The mean-shifting technique may stop when m(x)=x. In this embodiment, K(x−$x_i$) is the correlation between the color histogram of the original object (or region) and the histogram at point $x_i$. Thus, the original image (from the hand detection module 106) may be converted into another color space (e.g., hue-saturation-value (HSV)) so that color histogram information can be readily extracted. Again, different tracking systems/techniques may be used in other embodiments, but the inventors herein have determined that the mean-shifting techniques described above may generate an appropriate level of accuracy and approximation while reducing significant processing requirements, thus increasing system performance and throughput.

The image processing module 104 may also include a skin segmentation module 112 generally configured to identify the skin colors of a hand within a hand region of an image (defined by the hand detection module 108 and/or hand tracking module 110). The skin segmentation module 112 may include custom, proprietary, known and/or after-developed skin identification code (or instruction sets) that are generally well-defined and operable to distinguish skin tones or colors from other areas of the hand region. Such known skin identification systems include thresholding on hue-saturation color components, HSV color statistics, color-texture modeling, etc.

In one example embodiment, the skin segmentation module 112 may use a generalized statistical skin color model, such as a multi-variable Gaussian model. In this example, the inputs to the generalized skin color model may include the hand region and the face region (defined by the face detection module 106). Assuming that the hand and face regions are defined in an RGB color space, each pixel within the region may be processed to determine the probability that an individual pixel represents a skin color. The probability that a given pixel represents a skin color distribution is given by:

$$p(x \mid \text{skin}) = \frac{1}{2\pi \|\Sigma_s\|^{1/2}} \exp\left(-\frac{1}{2}(x - \mu_s) T \sum_s^{-1} (x - \mu_s)\right) \qquad \text{EQ. 2}$$

The RGB color space, under some lighting conditions, may not generate adequate results in the generalized skin color model. This may cause control errors and/or slowed system performance. Accordingly, in this embodiment, to further enhance the skin color detection probabilities, the RGB image may first be normalized into a more stable and less light-sensitive color space, for example the [rg] color space that defines a chrominance vector for each pixel. Thus, in EQ.

2, $x=[r, g]^T$ denotes the chrominance vector of an input pixel with RGB color component, and the RGB pixel is normalized by setting $r=R/(R+G+B)$ and $g=G/(R+G+B)$. The variables $\mu_s$ and $\Sigma_s$ represent the mean vector and the covariance matrix of the skin color model. The probability that a pixel represents skin given its chrominance vector x, p(skin|x) can be evaluated using Bayesian theorem. Here, it is assumed that skin and non-skin pixels occur with equal probability. Therefore, $$p(\text{skin}|x) = \frac{p(x|\text{skin})p(\text{skin})}{p(x|\text{skin})p(\text{skin}) + p(x|\neg\text{skin})p(\neg\text{skin})} = \frac{p(x|\text{skin})}{p(x|\text{skin}) + p(x|\neg\text{skin})} \propto p(x|\text{skin}) \quad \text{EQ. 3}$$

For a pixel x, if p(x|skin)>t (where t is a predefined threshold), the pixel may be determined as a skin pixel; otherwise, the pixel may be determined as a non-skin. In this embodiment, the threshold, may be selected to be a relatively low probability (e.g., on the order of 0.1).

The general skin color model is typically trained on large quantities data, not for a specific person or a specific environment (such as lighting, illumination). Initially, the skin color model may have predefined mean vector values ($\mu_s$) and covariance matrix values ($\Sigma_s$) based on the training. Thus, typically, the skin color model as described above may have an unacceptable number of false skin color probability results. To improve on skin color detection of the general skin color model described above, and to provide more accurate skin color detection of the hand region in variable lighting conditions, the skin color model, in this embodiment, may iteratively update mean and covariance data from the face region. For example, in a first pass, the general skin color model (described above) may be applied to the face region of an image using predefined mean and covariance data. Once facial pixels are identified as probable skin colors, updated mean vector ($\mu_s$) and the covariance matrix ($\Sigma_s$) may be obtained for the skin colors identified in the face region. In a next pass, the updated $\mu_s$ and $\Sigma_s$ from the face region may be used to process the hand region, thus enabling the generalized skin color model to provide more accurate results for a specific image and under specific lighting conditions. Here, the face may be used on the first pass since the face region, generally, represents a larger area in the image, and, depending on the face detection technique utilized by the face detection module 106, face detection may generally be more robust, reliable and accurate than hand detection. The output of the skin segmentation module 112 may include a binary image of the hand region, for example, where skin colors are assigned a binary value of 1 (e.g., white) and non-skin colors are assigned a binary value of 0 (e.g., black).

The image processing module 104 may also include a shape feature extraction module 114 generally configured to identify one or more shape features of the hand in the binary image generated by the skin segmentation module 112. The shape features, generally, include intrinsic properties and/or "markers" of the hand shape in the binary image, and may be used to improve the efficiency hand gesture recognition module 116 (described below) to identify a hand gesture in the image. Shape features may include, for example, eccentricity, compactness, orientation, rectangularity, width center, height center, the number of defects, difference between left and right parts, difference between top and bottom parts, etc.

Figure 2:
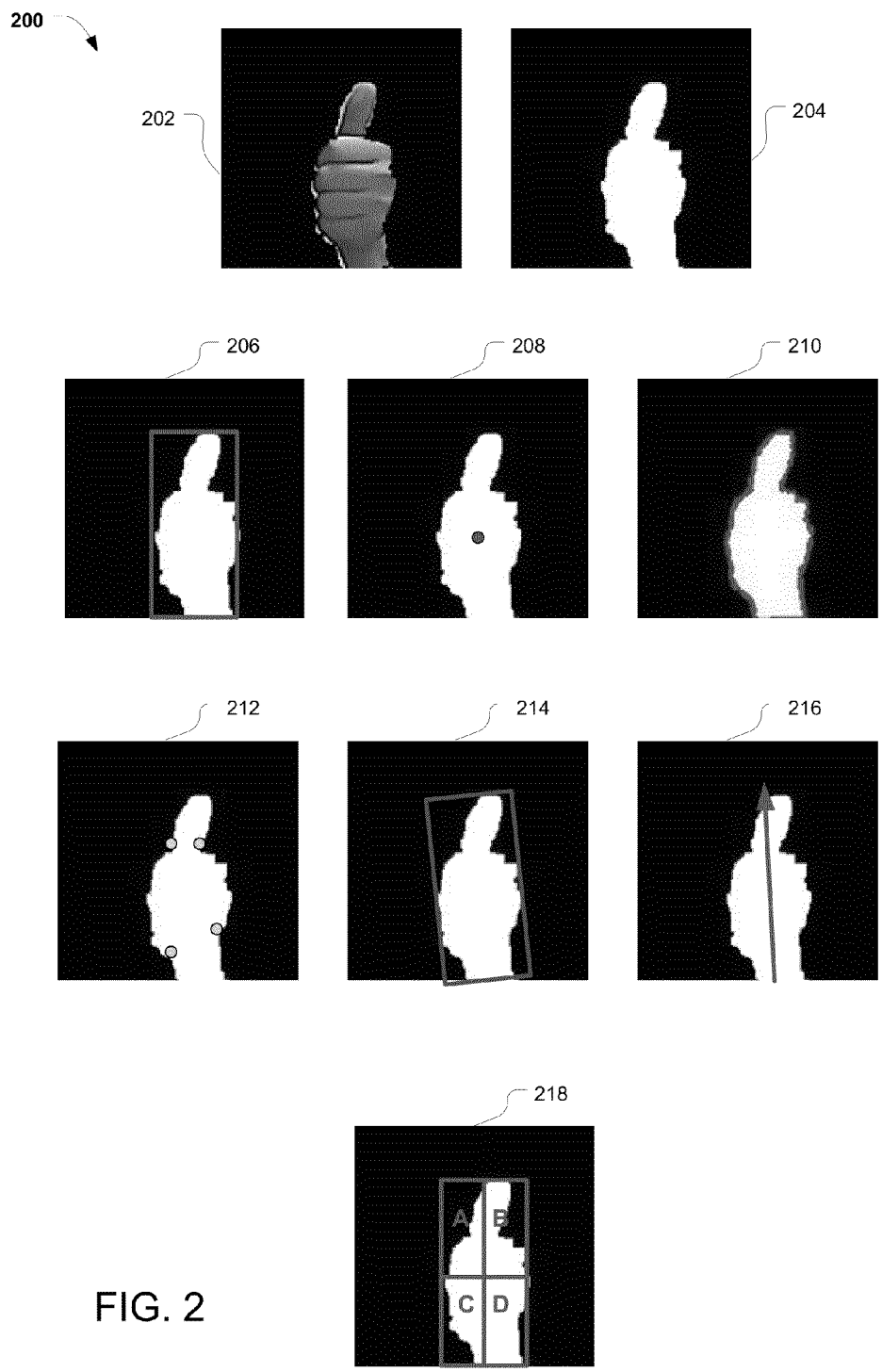
FIG. 2 depicts images of a "thumb up" hand gesture (left hand) consistent with one embodiment of the present disclosure.

FIG. 2 depicts images of a "thumb up" hand gesture (left hand) consistent with one embodiment of the present disclosure. With continued reference to FIG. 1, the original image 202 is an RGB format color image. A binary image 204, generated by the skin segmentation module 112, is depicted showing non-skin pixels as black and skin pixels as white. The shape feature extraction module 114 may be configured to generate a boundary shape that surrounds, or partially surrounds the hand in the binary image, as depicted in image 206. The bounding shape may be rectangular, as depicted, and in other embodiments, the bounding shape may include a circle, oval, square and/or other regular or irregular shape, depending on, for example, the geometry of the hand in the image. Based on the bounding shape, shape feature extraction module 114 may be configured to determine the eccentricity, rectangularity, compactness and center of the image within the boundary shape, and also determine the area as a count of the white pixels in the image and the perimeter as a count of the white pixels at the edge (e.g., the white pixels that are directly next to black pixels). Eccentricity may be determined as the width of the bounding shape times the height of the bounding shape; rectangularity may be determined as the area divided by the area of the bounding box; and compactness may be determined as the perimeter (squared) divided by the area. In addition, the shape feature extraction module 114 may be configured to determine the center of the hand within the bounding shape, as depicted in image 208. The center may be determined as the middle of the bounding shape along both a horizontal axis (e.g., x-axis) and a vertical axis (e.g., y-axis).

The shape feature extraction module 114 may also be configured to identify the contour of the hand, as depicted in image 210. The contour may be identified by determining the transition between adjacent pixels from a binary 1 (white) to a binary 0 (black), where the pixels on the boundary define the contour. The shape feature extraction module 114 may also be configured to determine the number of defects that lay along the contour, and four such defects are depicted in image 212. The defects may be defined as local defect of convexity, e.g., the pixel locations where a concave region has one or more convex pixels. The shape feature extraction module 114 may also be configured to determine a minimum shape that enclosed the contour (210), as depicted in image 214. The minimum shape (a rectangle in this example) may be defined by the left-most, right-most, highest and lowest white pixels in the image, and may be slanted with respect to the axes of the image, as depicted. The angle of the minimum shape with respect to the horizontal axis of the image may be determined by the shape feature extraction module 114. In addition, the shape feature extraction module 114 may determine the minimum box width to height ratio defined as the minimum box width divided by the minimum box height. Based on the angle of the minimum shape with respect to the horizontal axis, the shape feature extraction module 114 may also determine the orientation of the hand within the image. Here, the orientation may be defined as line taken from the center of, and normal to, the width of the minimum shape, as depicted in image 216.

The shape feature extraction module 114 may also be configured to divide the boundary shape (image 206) into a plurality of substantially equal segments, as depicted in image 218. In this example, the boundary shape is divided into four equal rectangular sub-blocks, labeled A, B, C and D. Based on the sub-blocks, the shape feature extraction module 114 may also be configured to determine the number of white pixels in each sub-block, the difference between the number of pixels in the left and right halves of the image (e.g., (A+C)−(B+D)), and the difference between the number of pixels in the top and bottom halves of the image (e.g., (A+B)−(C+D)).

The foregoing examples of the operations of the shape feature extraction module 114 and the described shape features are not intended to be an exhaustive list, nor would all the shape features described above be useful or necessary in determining the hand gesture depicted in the image. Thus, in some embodiments and for other hand gestures, additional shape features may be determined or a subset of the described shape features may be determined.

Referring again to FIG. 1, the image processing module 104 may also include a hand gesture recognition module 116 generally configured to identify the hand gesture with a hand region of an image, based on the hand shape features identified by the shape feature extraction module 114. The hand gesture recognition module 116 may include custom, proprietary, known and/or after-developed skin identification code (or instruction sets) that are generally well-defined and operable to identify a hand gesture within an image. Known hand gesture recognition systems that may be used according to the teachings of the present disclosure include, for example, pattern recognition systems, Perseus models (and derivatives thereof), Hidden Markov models (and derivatives thereof), support vector machine, linear discriminate analysis, decision tree, etc.

Figure 3A:
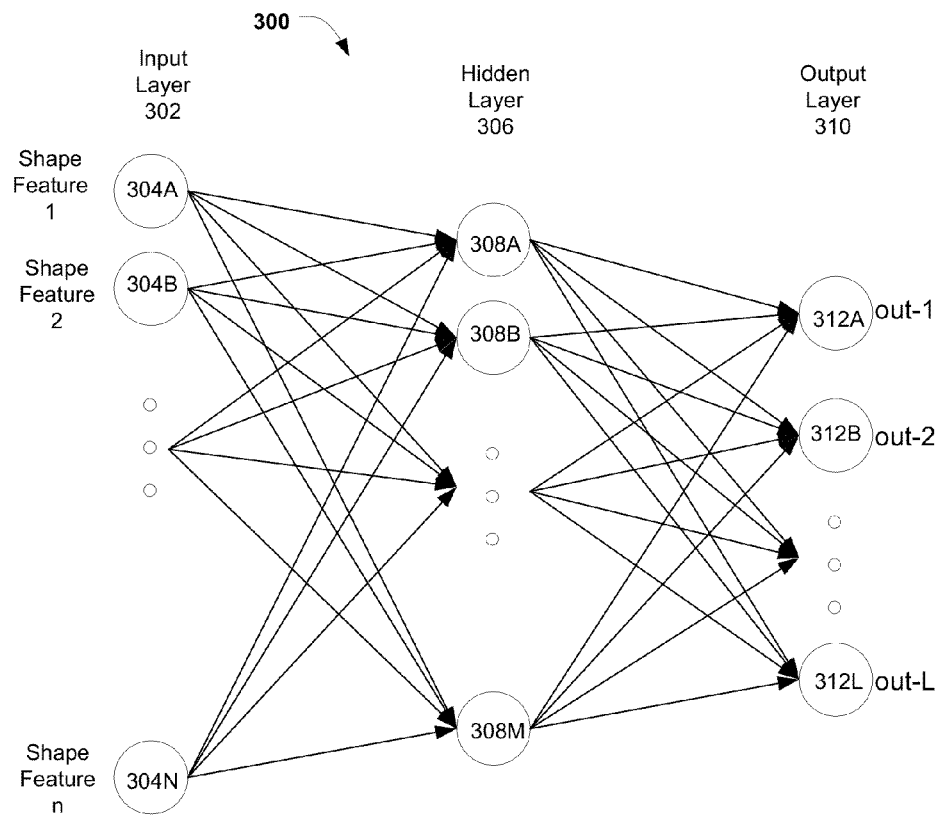
FIG. 3A depicts an example of a modified MLP model consistent with one embodiment of the present disclosure.

In one example embodiment, the hand gesture recognition module 116 may use a multilayer perceptron (MLP) model that iteratively maps one or more inputs onto one or more outputs. The general framework for the MLP model is known and well-defined, and generally includes a feedforward neural network that improves on a standard linear preceptron model by distinguishing data that is not linearly separable. In this example, the inputs to the MLP model may include one or more shape features generated by the shape feature extraction module 114. FIG. 3A depicts an example of a modified MLP model 300 consistent with one embodiment of the present disclosure. The MLP model 300 includes an input layer 302 defined by a plurality of input nodes 304A-304N. Each node may comprise a shape feature of the hand image. The MLP model 300 may also include a "hidden" or iterative layer 306 defined by "hidden" neurons 308A-308M. Typically, M is less than N, and each node of the input layer 302 is connected to each neuron in the "hidden" layer 306.

The MLP model 300 also includes an output layer 310 defined by a plurality of output neurons 312A-312L. Each output neuron may be connected to each neuron in the "hidden" layer. An output neuron, generally, represents a probability of a predefined output. The number of outputs may be predefined and, in the context of this disclosure, may match the number of hand gestures that may be identified by the module 116. Thus, for example, each output neuron 312A-312L may indicate the probability of a match of the hand gesture images 130A-103F depicted in FIG. 1, and the last output 312L is indicative of the greatest probability.

Figure 3B:
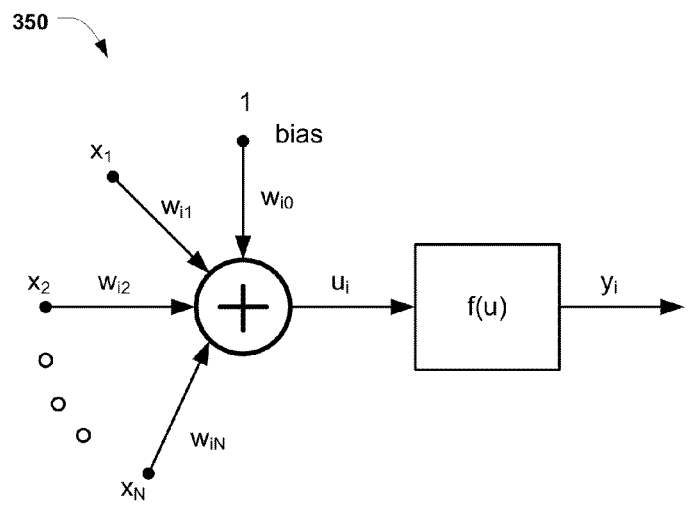

A computation system 350 for each layer of the MLP model is depicted in FIG. 3B. The computation system, in each layer, given the inputs $x_j$ of a layer m, the outputs $L_i$ of the layer n+1 are computed as:

$$u_i = \sum_j (w_{i,j}^{n+1} \cdot x_j) + w_{i,bias}^{n+1} \quad \text{EQ. 4}$$

$$y_i = f(u_i) \quad \text{EQ. 5}$$

The f function, assuming a sigmoid activation function, may be defined as:

$$f(x) = \beta \cdot (1 - e^{-\alpha x})/(1 + e^{-\alpha x}) \quad \text{EQ. 6}$$

The MLP model may be enabled to learn using backpropogation techniques, which may be used to generate the parameters $\alpha$, $\beta$ are learned from the training procedure. Each input $x_j$ may be weighted, or biased, indicating a stronger indication of hand gesture type. The MLP model may also include a training process which may include, for example, identifying known hand gestures so that the MLP model can "target" these known hand gestures during each iteration.

The output of the hand gesture recognition module 116 may include a signal or data set indicative of the type of hand gesture identified. This, in turn may be used to generate a command signal 118 to control one or more aspects of an application and/or system (not shown) coupled to the image processing module 104.

Figure 4:
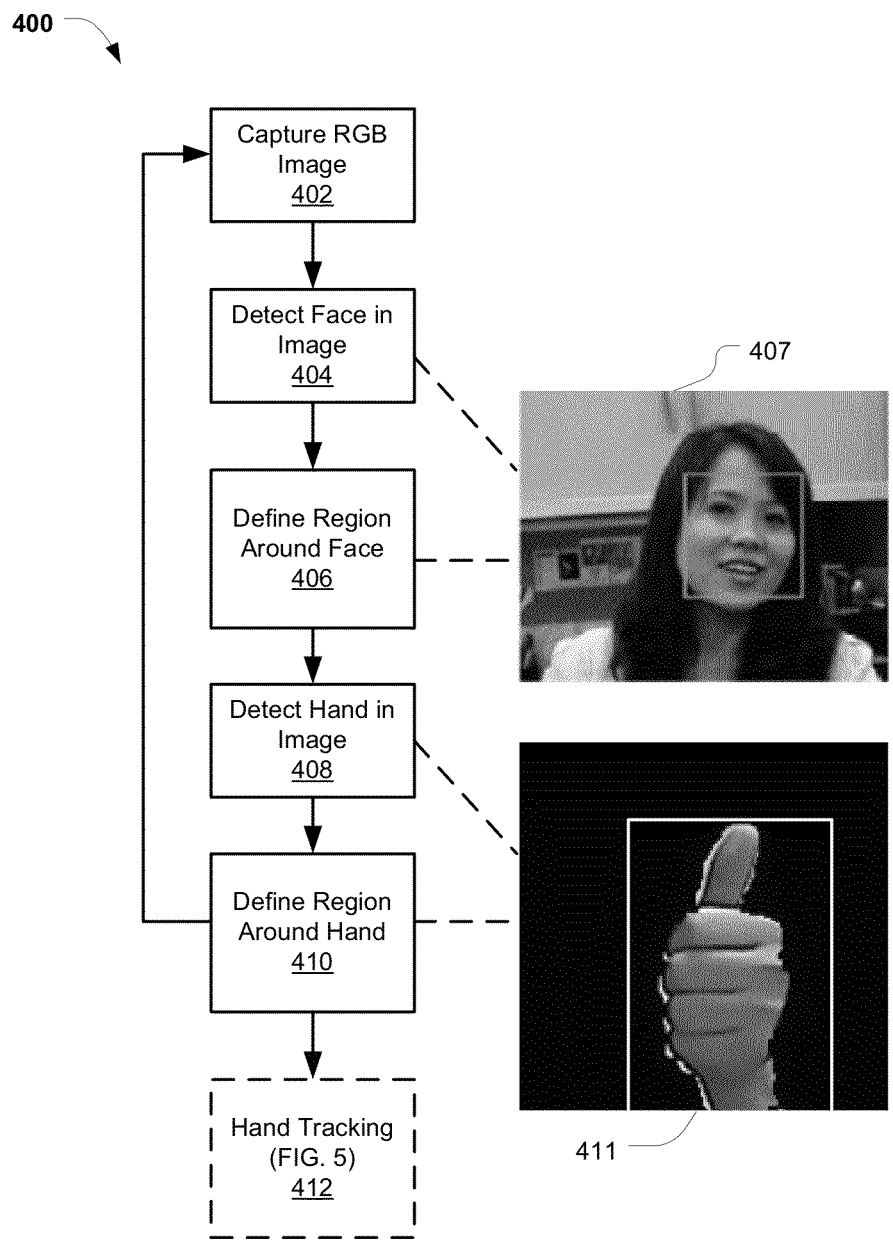
FIG. 4 illustrates a flowchart of operations for hand and face detection in an image consistent with one embodiment of the present disclosure.

FIG. 4 illustrates a flowchart of operations 400 for hand and face detection in an image consistent with one embodiment of the present disclosure. Operations according to this embodiment include capturing an RGB image of a person 402. Operations may also include detecting a face in the image 402 and defining a region around the face in the image 406, as depicted in the inset RGB image 407. Operations may also include detecting a hand in the image 408 and defining a region around the hand in the image, as depicted in the inset image 411. With the hand and face detected in the image, operations may further include tracking the hand 412 as described with reference to FIG. 5.

Figure 5:
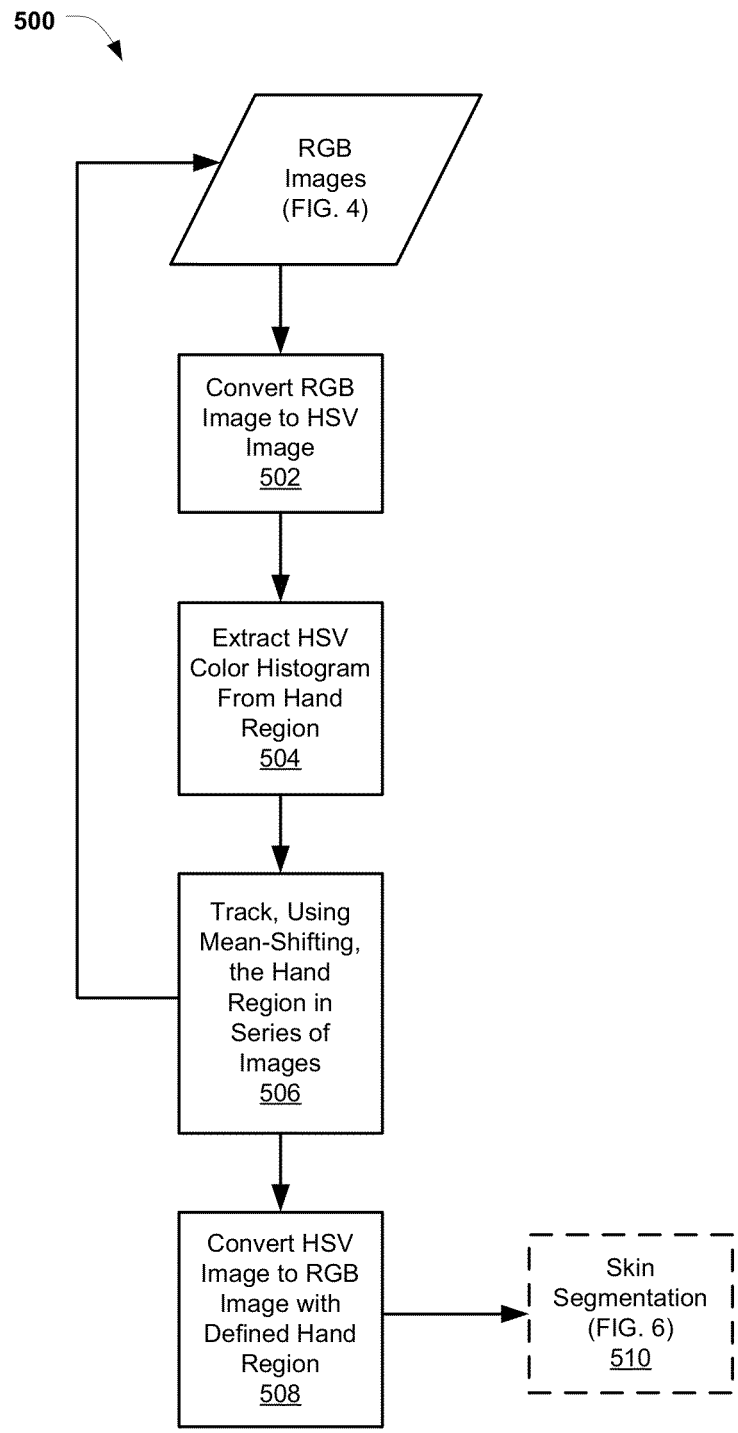
FIG. 5 illustrates a flowchart of operations for tracking a hand region in a series of images consistent with one embodiment of the present disclosure.

FIG. 5 illustrates a flowchart of operations 500 for tracking a hand region in a series of images consistent with one embodiment of the present disclosure. The RGB images from FIG. 4 may be used in this embodiment, and operations may include converting, for each RGB image, the RGB image to an HSV image 502. Operations may also include extracting, for each RGB image, an HSV color histogram from the hand region of the image 504. Operations may further include tracking, using mean-shifting, the hand region in a series of images 506, and converting each HSV image back into an RGB image with the defined hand region 508.

Figure 6:
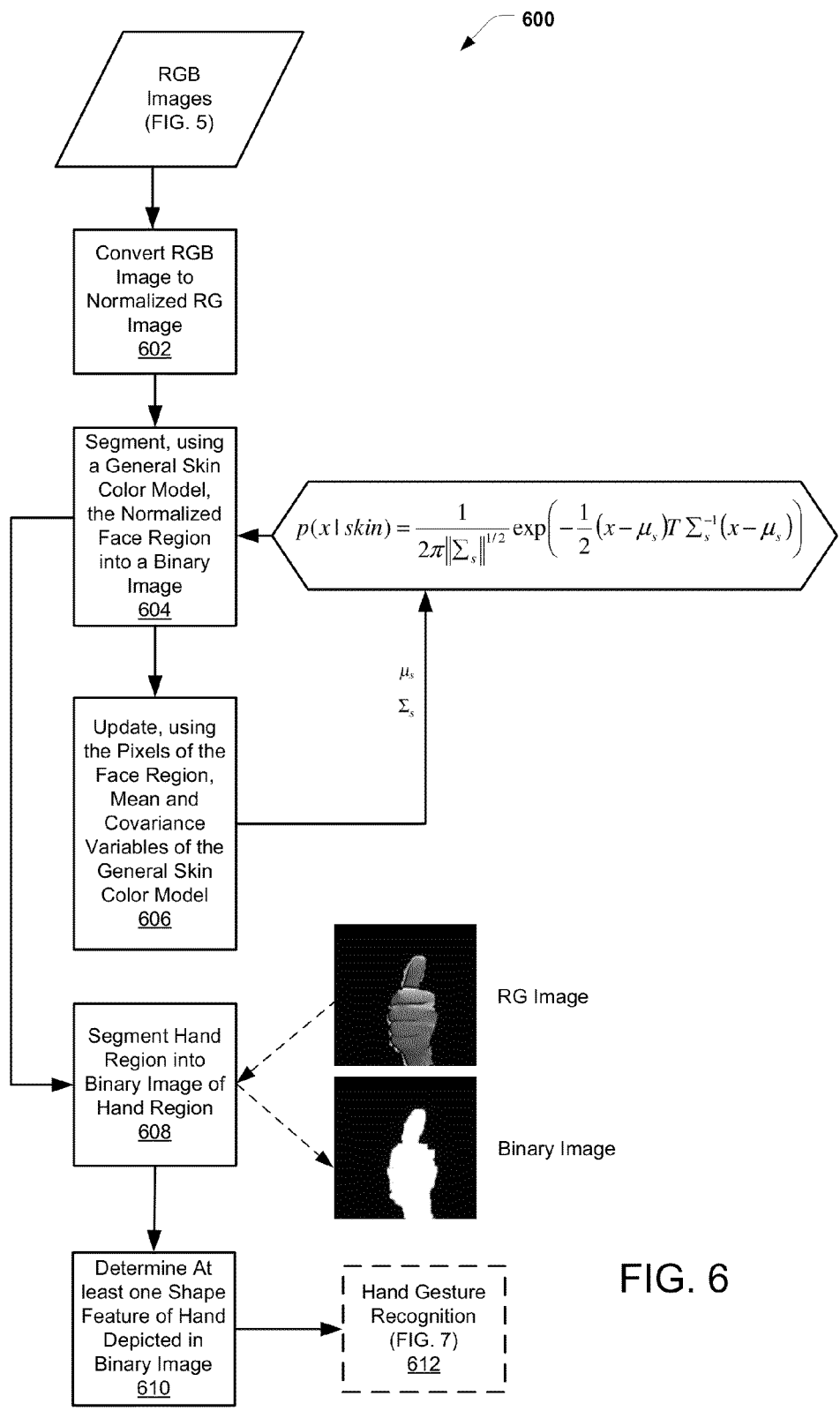
FIG. 6 illustrates a flowchart of operations for updating a general skin color model to segment a hand region of an image into a binary image and extracting hand shape features from the binary image consistent with one embodiment of the present disclosure.

FIG. 6 illustrates a flowchart of operations 600 for updating a general skin color model to segment a hand region of an image into a binary image and extracting hand shape features from the binary image consistent with one embodiment of the present disclosure. In this embodiment the RGB images with the defined hand region (FIG. 5) may be used as inputs, and the operations 600 may be performed on each image. Operations according to this embodiment include converting the RGB image into a normalized RG image 602. The face region of the RG image is segmented, using a general skin color model, into a binary image 604. Mean and covariance variables from the pixels of the face region are updated back into the general skin color model 606. The hand region is next segmented, using the general skin color model with updated mean and covariance variables, into a binary image of the hand region 608. Operations of this embodiment may also include determining at least one shape feature associated with the hand gesture in the binary image 610. The shape features may be used as inputs to identify the hand gesture in the image 612.

Figure 7:
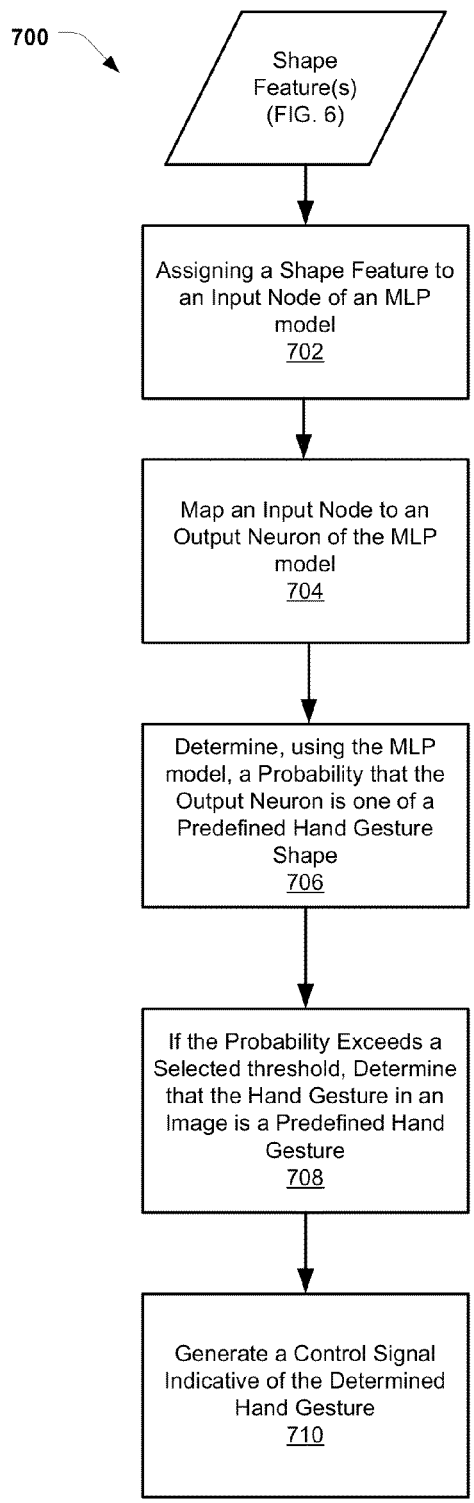
FIG. 7 illustrates a flowchart of operations for hand gesture recognition consistent with one embodiment of the present disclosure.

FIG. 7 illustrates a flowchart of operations 700 for hand gesture recognition consistent with one embodiment of the present disclosure. Operations according to this embodiment include assigning a shape feature to an input node of an MLP model 702, and mapping an input node to an output neuron of the MLP model 704. Operations may also include determining, using the MLP model, the probability that the output node is one of a predefined hand gesture shape 706. If the probability exceeds a selected threshold, operations may also include determining that the hand gesture in the image is a predefined hand gesture 708. Operations may also include generating a control signal indicative of the determined hand gesture 710.

Figure 8:
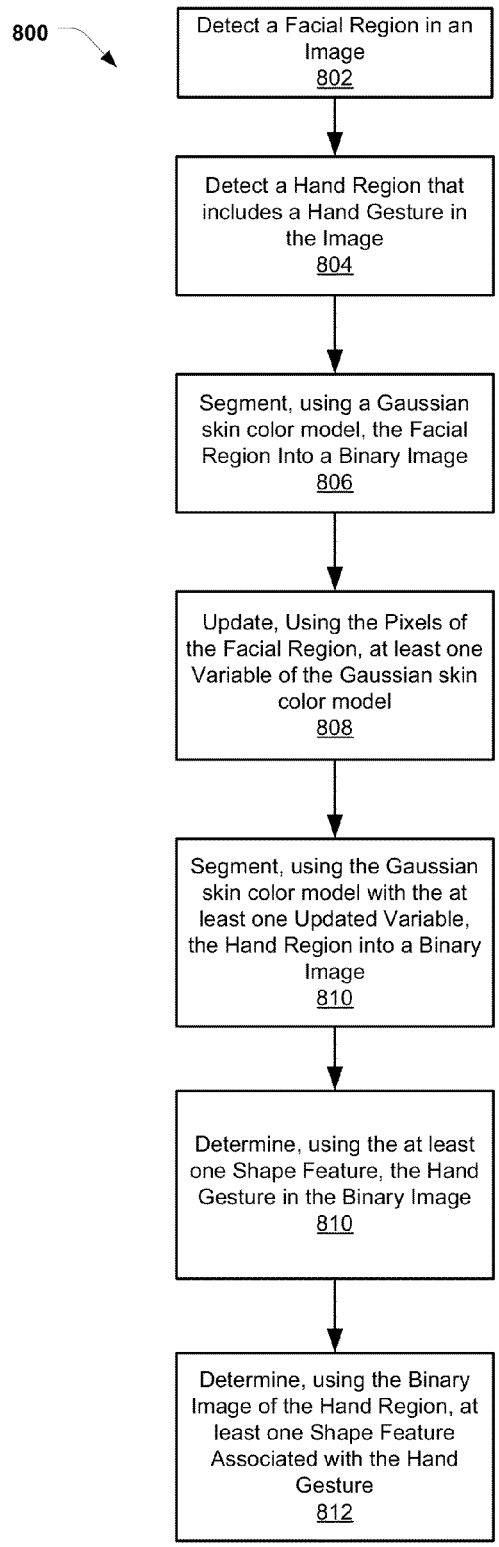
FIG. 8 illustrates a flowchart of operations for a method consistent with one embodiment of the present disclosure.

FIG. 8 illustrates a flowchart of operations 800 for a method consistent with one embodiment of the present disclosure. Operations according to this embodiment include detecting a facial region in an image 802, and detecting a hand region that includes a hand gesture in the image 804. Operations may also include segmenting, using a Gaussian skin color model, the facial region into a binary image 806, and updating, using the pixels of the facial region, at least one variable of the Gaussian skin color model 808. Operations may also include segmenting, using the Gaussian skin color model with the at least one updated variable, the hand region into a binary image 810. Operations may further include determining, using the binary image of the hand region, at least one shape feature associated with the hand gesture 812.

While the foregoing examples and embodiments described the input source image from the camera 102 as an RGB image, other color spaces may be used consistent with the teachings herein. For example, YUV, grayscale, infrared, xyz, uvw, Luv Lab, and/or other known or after-developed color space specifications may be used.

While FIGS. 4, 5, 6, 7 and 8 illustrate method operations according various embodiments, it is to be understood that in any embodiment not all of these operations are necessary. Indeed, it is fully contemplated herein that in other embodiments of the present disclosure, the operations depicted in FIGS. 4, 5, 6, 7 and/or 8 may be combined in a manner not specifically shown in any of the drawings, but still fully consistent with the present disclosure. Thus, claims directed to features and/or operations that are not exactly shown in one drawing are deemed within the scope and content of the present disclosure.

As used in any embodiment herein, the term "module" refers to software, firmware and/or circuitry configured to perform the stated operations. The software may be embodied as a software package, code and/or instruction set or instructions, and "circuitry", as used in any embodiment herein, may comprise, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), etc.

Certain embodiments described herein may be provided as a tangible machine-readable medium storing computer-executable instructions that, if executed by the computer, cause the computer to perform the methods and/or operations described herein. The tangible computer-readable medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The computer may include any suitable processing platform, device or system, computing platform, device or system and may be implemented using any suitable combination of hardware and/or software. The instructions may include any suitable type of code and may be implemented using any suitable programming language.

Thus, in one embodiment the present disclosure provides a method for determining a hand gesture in an image. The method of this embodiment includes detecting, by a face detection module, a facial region in the image; detecting, by a hand detection module, a hand region including a hand gesture in the image; segmenting, using a Gaussian skin color model, the facial region into a binary image; updating, using pixels of the facial region, at least one variable of the Gaussian skin color model; segmenting, using the Gaussian skin color model with the at least one updated variable, the hand region in the image into a binary image; determining, using the binary image of the hand region, at least one shape feature associated with the hand gesture; and determining, using the at least one shape feature, the hand gesture in the binary image.

In another embodiment, the present disclosure provides a system for determining a hand gesture in an image. The system of this embodiment includes a face detection module configured to detect a facial region in the image; a hand detection module configured to detect a hand region including a hand gesture in the image; a skin segmentation module configured to: segment, using a Gaussian skin color model, the facial region into a binary image, update, using pixels of the facial region, at least one variable of the Gaussian skin color model, and segment, using the Gaussian skin color model with the at least one updated variable, the hand region in the image into a binary image. The system also includes a shape feature extraction module configured to determine, using the binary image of the hand region, at least one shape feature associated with the hand gesture; and a hand gesture recognition module configured to determine, using the at least one shape feature, the hand gesture in the binary image.

In another embodiment, the present disclosure provides tangible computer-readable medium including instructions stored thereon which, when executed by one or more processors, cause the computer system to perform operations comprising:

detecting a facial region in an image;

detecting a hand region including a hand gesture in the image;

segmenting, using a Gaussian skin color model, the facial region into a binary image;

updating, using pixels of the facial region, at least one variable of the Gaussian skin color model;

segmenting, using the Gaussian skin color model with the at least one updated variable, the hand region in the image into a binary image;

determining, using the binary image of the hand region, at least one shape feature associated with the hand gesture; and determining, using the at least one shape feature, the hand gesture in the binary image.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A method for determining a hand gesture in an image, comprising:

detecting, by a face detection module, a facial region in the image;

detecting, by a hand detection module, a hand region including a hand gesture in the image;

segmenting, using a Gaussian skin color model, the facial region into a binary image;

updating, using pixels of the facial region, at least one variable of the Gaussian skin color model;

segmenting, using the Gaussian skin color model with the at least one updated variable, the hand region in the image into a binary image;

determining, using the binary image of the hand region, at least one shape feature associated with the hand gesture; and determining, using the at least one shape feature, the hand gesture in the binary image.

2. The method of claim 1, wherein:
the at least one variable includes a mean variable or a covariance variable.

3. The method of claim 1, wherein:
the at least one shape feature, as applied to the hand gesture in the image, is selected from the group of eccentricity, compactness, orientation, rectangularity, width center, height center, the number of defects, difference between left and right parts, difference between top and bottom parts, and orientation.

4. The method of claim 1, wherein the image is a red, green, blue (RGB) color image, the method further comprising:
for each RGB image in a series of RGB images:
converting, by a hand tracking module, the RGB image into a hue, saturation, value (HSV) image;
extracting, by the hand tracking module, a color histogram of the hand region in the HSV image; and
tracking, using mean-shifting, the hand region in the series of HSV images.

5. The method of claim 1, wherein determining the hand gesture comprising:
assigning, by a hand gesture recognition module, at least one shape feature to an input node of a multilayer perceptron (MLP) model;
mapping, by a hand gesture recognition module, the input node to an output neuron of the MLP model; and
determining, by a hand gesture recognition module using the MLP model, a probability that the output neuron is one of a predefined hand gesture shape.

6. The method if claim 1, further comprising:
generating a control signal indicative of the determined hand gesture.

7. A system for determining a hand gesture in an image, comprising: at least one processor configured to execute:
a face detection module configured to detect a facial region in the image;
a hand detection module configured to detect a hand region including a hand gesture in the image;
a skin segmentation module configured to:
segment, using a Gaussian skin color model, the facial region into a binary image;
update, using pixels of the facial region, at least one variable of the Gaussian skin color model; and
segment, using the Gaussian skin color model with the at least one updated variable, the hand region in the image into a binary image;
a shape feature extraction module configured to determine, using the binary image of the hand region, at least one shape feature associated with the hand gesture; and a hand gesture recognition module configured to determine, using the at least one shape feature, the hand gesture in the binary image.

8. The system of claim 7, wherein:
the at least one variable includes a mean variable or a covariance variable.

9. The method of claim 7, wherein:
the at least one shape feature, as applied to the hand gesture in the image, is selected from the group of eccentricity, compactness, orientation, rectangularity, width center, height center, the number of defects, difference between left and right parts, difference between top and bottom parts, and orientation.

10. The system of claim 7, wherein the image is a red, green, blue (RGB) color image, the system further comprising:
a hand tracking module configured to, for each RGB image in a series of RGB images:
convert the RGB image into a hue, saturation, value (HSV) image;
extract a color histogram of the hand region in the HSV image; and
track, using mean-shifting, the hand region in the series of HSV images.

11. The system of claim 7, wherein the hand gesture recognition module is further configured to:
assign at least one shape feature to an input node of a multilayer perceptron (MLP) model;
map the input node to an output neuron of the MLP model; and
determine, using the MLP model, a probability that the output neuron is one of a predefined hand gesture shape.

12. The system of claim 7, wherein the hand gesture recognition module is further configured to:
generate a control signal indicative of the determined hand gesture.

13. A non-transitory computer-readable medium including instructions stored thereon which, when executed by one or more processors, cause the computer system to perform operations comprising:
detecting a facial region in an image;
detecting a hand region including a hand gesture in the image;
segmenting, using a Gaussian skin color model, the facial region into a binary image;
updating, using pixels of the facial region, at least one variable of the Gaussian skin color model;
segmenting, using the Gaussian skin color model with the at least one updated variable, the hand region in the image into a binary image;
determining, using the binary image of the hand region, at least one shape feature associated with the hand gesture; and
determining, using the at least one shape feature, the hand gesture in the binary image.

14. The non-transitory computer-readable medium of claim 13, wherein:
the at least one variable includes a mean variable or a covariance variable.

15. The non-transitory computer-readable medium of claim 13, wherein:
the at least one shape feature, as applied to the hand gesture in the image, is selected from the group of eccentricity, compactness, orientation, rectangularity, width center, height center, the number of defects, difference between left and right parts, difference between top and bottom parts, and orientation.

16. The non-transitory computer-readable medium of claim 13 wherein the image is a red, green, blue (RGB) color image; wherein the instructions that when executed by one or more of the processors result in the following additional operations comprising:
for each RGB image in a series of RGB images:
converting the RGB image into a hue, saturation, value (HSV) image;
extracting a color histogram of the hand region in the HSV image; and
tracking, using mean-shifting, the hand region in the series of HSV images.

17. The non-transitory computer-readable medium of claim 13, wherein the instructions that when executed by one or more of the processors result in the following additional operations comprising:
assigning at least one shape feature to an input node of a multilayer perceptron (MLP) model;
mapping the input node to an output neuron of the MLP model; and
determining a probability that the output neuron is one of a predefined hand gesture shape.

18. The non-transitory computer-readable medium of claim 13, wherein the instructions that when executed by one or more of the processors result in the following additional operations comprising:
generating a control signal indicative of the determined hand gesture.

* * * * *